No. 890,713.  PATENTED JUNE 16, 1908.
J. ROSS.
RIGGER'S TRUCK.
APPLICATION FILED APR. 25, 1906.
3 SHEETS—SHEET 1.
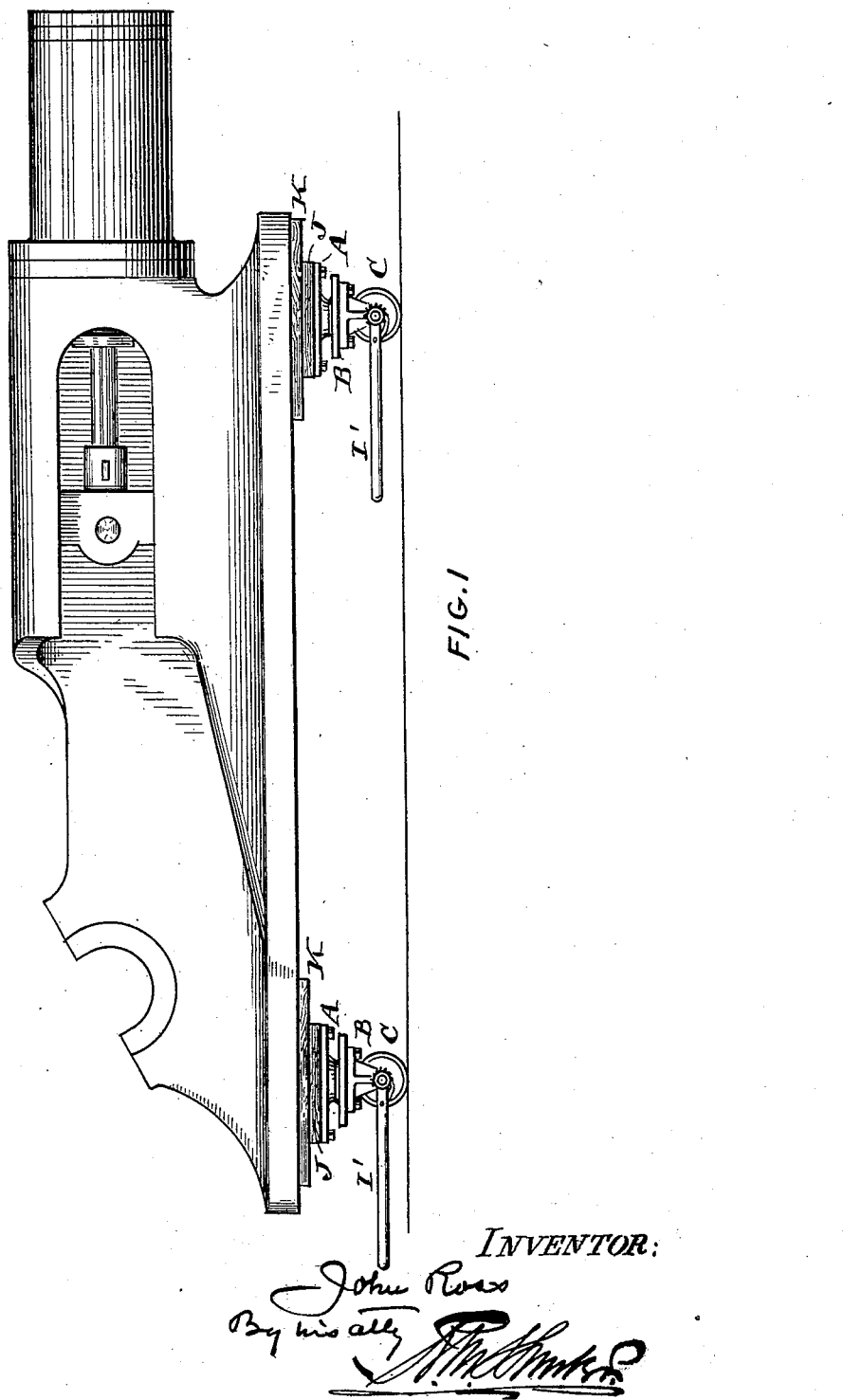

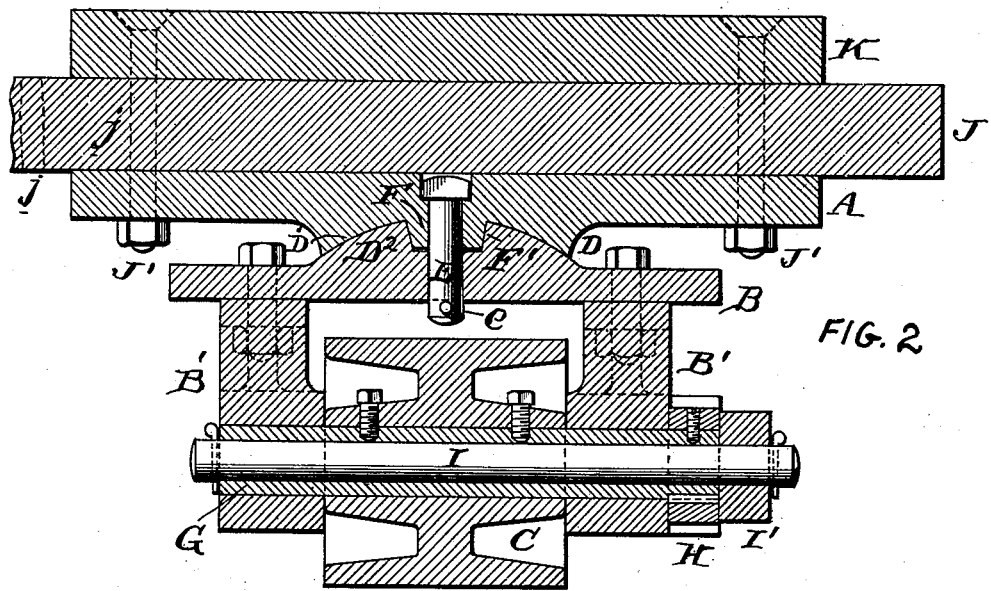
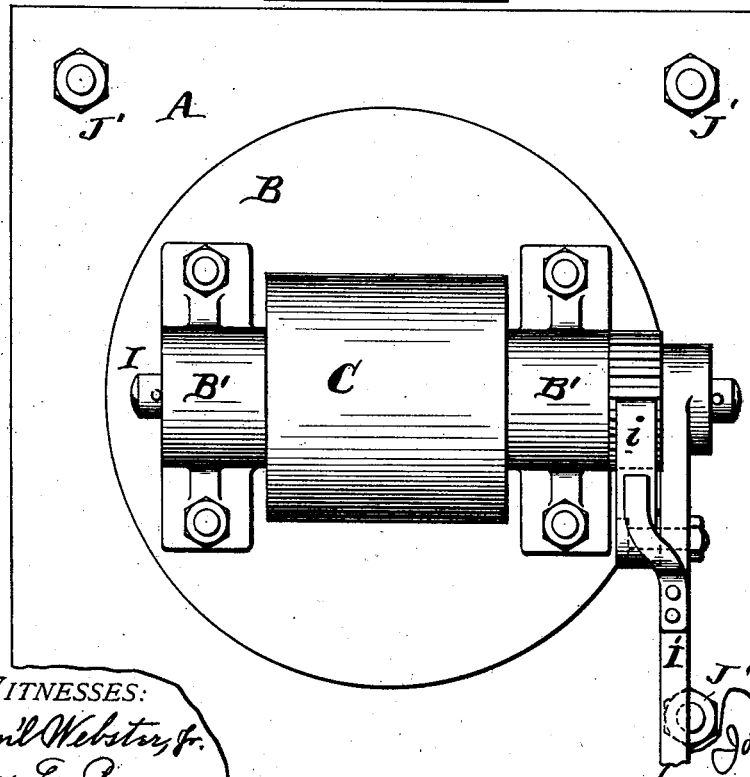

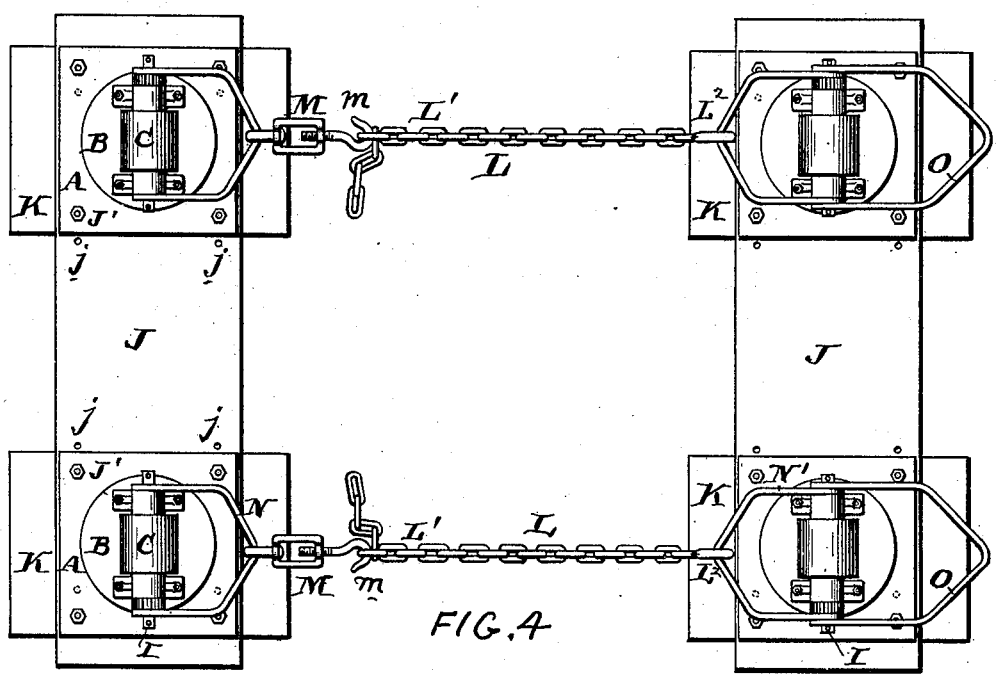
FIG. 4.
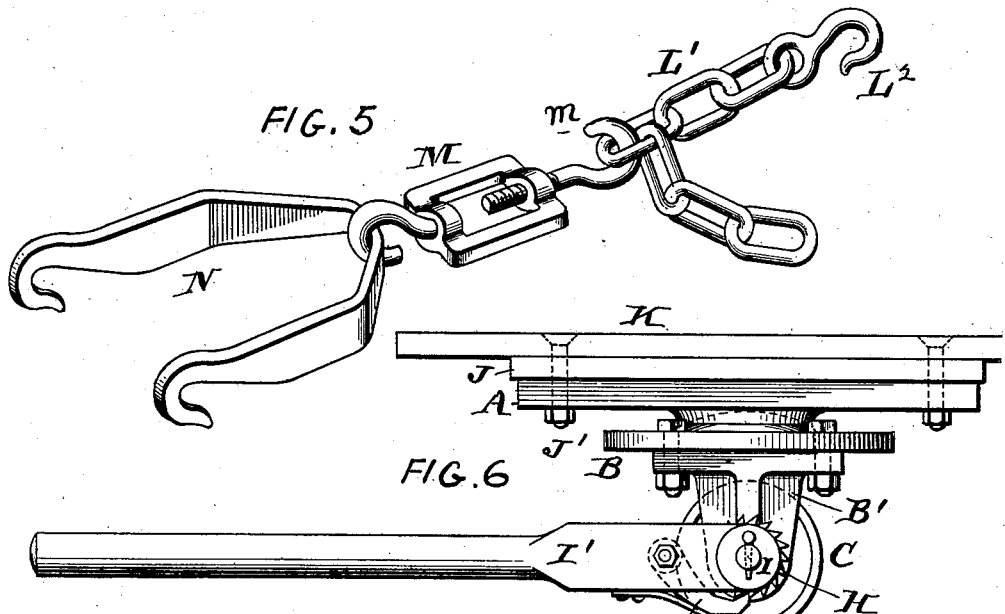
FIG. 5
FIG. 6
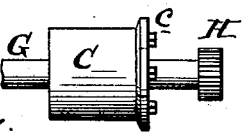
FIG. 7

UNITED STATES PATENT OFFICE.

JOHN ROSS, OF PHILADELPHIA, PENNSYLVANIA.

RIGGER'S TRUCK.

No. 890,713.  Specification of Letters Patent.  Patented June 16, 1908.

Application filed April 25, 1906. Serial No. 313,542.

*To all whom it may concern:*

Be it known that I, JOHN ROSS, of the city and county of Philadelphia and State of Pennsylvania, have invented an Improvement in Riggers' Trucks, of which the following is a specification.

My invention has reference to riggers' trucks and consists of certain improvements which are fully set forth in the following specification and shown in the accompanying drawings which form a part thereof.

The object of my invention is to provide means for moving heavy objects, such as machinery, building material, houses &c., which may be easily handled for speedy and accurate transportation of the object at a minimum cost.

My invention consists of a number of caster trucks adapted to be placed under the object to be moved and two of said trucks may be coupled together. Where two such caster trucks are mechanically connected, the union is by means which may be extended so as to adjust the caster wheels nearer together or farther apart as desired to suit the width of the object to be moved.

The caster trucks, more specifically consist of a frame in which the wheel is journaled pivoted to a top plate above the wheel whereby the caster wheel and its frame may be adjusted about a vertical axis through the axis of the wheel. The caster wheel is preferably provided with a ratchet wheel which may be operated by a pawl and lever for mechanically rotating the caster wheel when moving the object being transported. I prefer to secure the caster wheel and ratchet wheel upon a hollow shaft through which a removable shaft may be placed, thereby permitting two adjacent caster wheels to be joined as if upon a common axle when straight ahead travel is required, and also providing means for introducing a lever with which to turn or adjust the caster wheels about the vertical axis.

My invention also provides means for mechanically connecting the forward and rear caster trucks whereby horse power may be applied to the forward truck and be transmitted to the axle of the rear truck to avoid possible tilting of the latter and injury of the pivot between the caster wheel frame and top plate.

My invention also comprehends details of construction which, together with the features above specified, will be better understood by reference to the accompanying drawings, in which:

Figure 1 is a side elevation of my improved rigger's truck in use; Fig. 2 is sectional elevation of one of the caster trucks; Fig. 3 is an inverted plan view of the same; Fig. 4 is an inverted plan view of the rigger's truck having the forward and rear caster trucks connected; Fig. 5 is a perspective view of the connecting means between the forward and rear caster trucks; Fig. 6 is a side elevation of one of the caster trucks with the operating lever and pawl applied; and Fig. 7 is an elevation of the caster wheel and axle showing a modification.

A is the top plate, B is the caster wheel frame and C is the wheel. The frame B is preferably circular at the top and joined to the top plate A by a ball and socket joint D comprising the parts D' D², preferably with the socket or cup on the underside of the top plate, as shown. These parts are joined by a king pin E extending down through the top plate and secured in position by a cotter pin e on the under side of the plate or frame B.

To remove excessive lateral strain from the pin E, I prefer to form a vertical and circular stud F on the under side of the plate A which is journaled in a cylindrical socket F' in the crown of the ball D² of the frame B. The king bolt E extends centrally through the vertical stud F. By this construction the frame B is pivoted to the plate A so that it may rotate on a vertical axis and an extended surface is presented which gives sufficient friction to prevent accidental shifting of the caster wheel frame B in use. The ball and socket joint also resists lateral displacement of the two parts A and B and greatly assists the stud F and socket F' in keeping the two parts in vertical alinement.

The brackets B' in which the axle G of the caster wheel is journaled may be bolted to the circular plate of the frame B or cast integral therewith as preferred. The caster wheel C is rigidly secured to the tubular axle G by set screws or otherwise. One end of this hollow axle is provided with a ratchet wheel H, which upon being rotated rotates the caster wheel itself. A loose shaft I extends through the hollow axle G and may be retained in place by cotter pins. When the operating lever and pawl is to be used for the ratchet wheel it is journaled upon this shaft as shown.

I' is the lever and i is the spring actuated pawl. The shaft I is preferably just long enough to support the lever I' beyond the hollow shaft. By oscillating the lever the ratchet wheel is rotated and with it, the hollow shaft and caster wheel C, to propel the truck.

In practice two of the casters are coupled by a transverse board J having holes $j$ through which bolts J' pass to unite it to the top plates A. In this manner the casters can be adjusted transversely nearer together or farther apart as desired, to suit the width or shape of the object to be moved. Above each caster truck I prefer to provide a short sill K which extends in front and to the rear of the top plate A and is secured in place by the same bolts J' which secure the transverse board to the caster trucks. These sills K directly support the object to be moved and act to prevent the caster trucks tilting over. Ordinarily, the sills will be of wood, but may be of metal when desired.

It is evident that the complete rigger's truck may comprise two or more caster trucks. In some cases four caster trucks would be used connected in pairs as shown in Fig. 4, while in other cases three caster trucks may be used, in which two would be coupled by the transverse board J and the third one placed under the object where required. In other cases, the caster wheels C may be made very wide and two such caster trucks used under long beams or girders. Ordinarily, however, four caster trucks will be employed, coupled in pairs by transverse boards J, and these in some cases, especially for straight pulling of the truck and load, may be connected by draft cables L which connect the forward casters with the rear casters as more fully shown in Figs. 4 and 5. These draft chains as shown comprise a chain L' having a hook L² and connected through its links with the hook $m$ of a tension device M having capacity for longitudinal adjustment equal to approximately the length of a link of the chain. This tension device is in the form of a turnbuckle and connects with a yoke N which is hooked over the ends of the shaft I of one of the casters, and the hook L² on the chain L' connects with a yoke N' hooked over the shaft I of the caster immediately in front of the caster to which the yoke N is connected. By hooking any desired link into the hook $m$ the length of the draft chain between the yokes may be adjusted to suit the distance apart of the casters. By the use of these draft chains, it is evident that the rear casters may be pulled forward by the forward casters and not tilt over upon meeting an obstruction. I do not restrict myself to the use of this form of draft device between the forward and rear casters, nor in fact to the use of any draft device, for in many cases such will not be required.

Yokes O may be hooked upon the shafts I of the forward casters by which to apply power such as by a horse or men in pulling the draft truck and load as a whole. In some cases a long length of pipe may be substituted for the shafts I so as to connect the two axles of the casters of the truck which would aid in making them travel straight, and by removing such shafts I and introducing the end of crowbar or the long pipe the caster wheels may be easily turned about vertical axes. It is also evident that the same result may be had by partly withdrawing the shaft I and beating it around or extending it with a section of pipe or by any other common expedient in the "rigger's" art. It will also be seen that where there is excessive strains put upon the casters and the frame B is apt to tilt, this may be avoided by driving in wooden wedges between the parts A and B.

In cases, where my invention is used upon rails, the caster wheels C should be provided with flanges as shown in Fig. 7. In these cases, however, it will be necessary to have the flanges $c$ removable or adjustable so that they may not act to obstruct the turning of the caster wheel so as to permit travel upon another rail arranged transversely to that upon which it may have been traveling, ordinarily, the flange may be in the form of an annular disk $c$ bolted to the end of the wheel C. By removing the bolts and slightly lifting the flange sufficiently not to project below the bottom of the wheel, the latter may be turned.

It will be observed that my improved rigger's truck has all of the several caster wheels adjustable about individual vertical axes so that any shifting movement desired to the object may be given to suit the requirements.

I do not restrict myself to the details of construction shown as these may be modified without departing from the spirit of my invention.

Having now described my invention, what I claim as new and desire to secure by Letters Patent, is:

1. A caster truck for riggers' use consisting of a rectangular top plate of large area having holes near its corners, combined with a caster wheel frame pivoted to the top plate on a vertical axis and held at a distance from said plate except at the pivot, a caster wheel journaled in the caster wheel frame and located immediately below the pivot thereof, and a hand power device wholly outside of the caster wheel frame for rotating the caster wheel.

2. A caster truck for riggers' use consisting of a top plate, combined with a caster wheel frame pivoted to the top plate on a vertical axis, a caster wheel having a shaft journaled in the caster wheel frame and located immediately below the pivot thereof and close to the sides of the said frame, and a hand power device for rotating the caster wheel consisting of a ratchet wheel secured to the shaft of the caster wheel outside of the caster wheel frame and a lever and pawl for rotating the ratchet wheel.

3. A caster truck for riggers' use consisting of a top plate of large area having bolt holes near its edges and having a central downwardly directed socket at its center, combined with a caster wheel, a caster wheel frame in which the caster wheel is journaled having at its top above the caster wheel an extension provided with a spherical surface received in the socket of the top plate which latter is elevated above the caster wheel frame, and means for imparting a rotary motion to the caster wheel.

4. A caster truck for riggers' use consisting of a top plate of large area having holes near its edges and having a central downwardly directed socket at a lower elevation, combined with a caster wheel, a caster wheel frame in which the caster wheel is journaled having at its top above the caster wheel an extension provided with a spherical surface received in the socket of the top plate and locked therein to prevent lateral movement, a bolt extending through the socket and spherical extension for holding the top plate and caster wheel frame together while permitting rotary motion in a horizontal plane, and means for imparting a rotary motion to the caster wheel.

5. A caster truck for riggers' use consisting of a top plate having a central downwardly directed socket provided with a downwardly extending central stud F, combined with a caster wheel, a caster wheel frame in which the caster wheel is journaled having at its top above the caster wheel an extension provided with a spherical surface received in the socket of the top plate and also having a socket F' for the central stud F of the top plate, a bolt extending through the central stud and caster wheel frame for holding the latter to the top plate, and means for imparting a rotary motion to the caster wheel.

6. A caster truck for riggers' use consisting of a top plate, combined with a caster wheel frame pivoted to the top plate, a caster wheel arranged below the pivot, a hollow shaft secured to the caster wheel and journaled in the caster wheel frame, a removable solid shaft extending through the hollow shaft, and hand power devices for rotating the hollow shaft.

7. A caster truck for riggers' use consisting of a top plate, combined with a caster wheel frame pivoted to the top plate, a caster wheel arranged below the pivot, a hollow shaft secured to the caster wheel and journaled in the caster wheel frame, a removable solid shaft extending through the hollow shaft, and hand power devices for rotating the hollow shaft consisting of a ratchet wheel secured to the hollow shaft and a lever provided with a pawl hinged to the solid shaft for rotating the ratchet wheel.

8. A caster truck for riggers' use consisting of a top plate, combined with a caster wheel frame pivoted to the top plate, a caster wheel arranged below the pivot, a hollow shaft secured to the caster wheel and journaled in the caster wheel frame, a removable solid shaft extending through the hollow shaft, a detachable draft yoke adapted to hook over the ends of the solid shaft upon opposite sides of the caster wheel frame and detachable hand power devices for rotating the hollow shaft.

9. A caster wheel truck for riggers' use consisting of a flat top plate, combined with a caster wheel frame having a circular upper plate held at a distance from the top plate by a central pivot connecting it with the top plate and by which it is freely rotatable upon a vertical axis, a caster wheel journaled in the caster wheel frame below the pivot, and hand power means for rotating the caster wheel.

10. In a riggers' truck, two caster trucks each having a top plate, a caster wheel frame pivoted to the top plate, a single caster wheel journaled in the frame immediately below the pivot and power devices for rotating the caster wheels, combined with a transverse board adjustably secured to the top plates over the pivots for holding the caster trucks at different distances apart to suit the load and permitting each caster wheel to be independently rotated or adjusted about a vertical axis while maintaining its contact with the ground immediately below the pivot.

11. In a rigger's truck, two caster trucks each having a top plate, a caster wheel frame pivoted to the top plate, a single caster wheel journaled in the frame immediately below the pivot and power devices for rotating the caster wheels, combined with short sills K secured to the top plates and by which the load is supported, a transverse board adjustably secured between the top plates and sills for holding the caster trucks at a distance apart to suit the load and permitting each caster wheel to be independently rotated or adjusted about a vertical axis.

12. A caster truck for riggers' use consisting of a top plate, and a removable sill secured to the top plate and extending beyond it upon two of its opposite sides, combined with a caster wheel frame pivoted to the top plate on a vertical axis, a single caster wheel journaled in the caster wheel frame and located immediately below the pivot thereof, and a hand power device for rotating the caster wheel.

13. In a rigger's truck a forward and a rear caster truck each comprising a top plate, a caster wheel frame pivoted to the top plate on a vertical axis, a single caster wheel journaled in said frame centrally and immediately below the pivot by a transverse axle, combined with an extensible draft connection between the caster wheel frames outside of the caster wheels of the two caster trucks in alinement with the axles thereof.

14. In rigger's truck a forward and a rear caster truck each comprising a top plate, a caster wheel frame pivoted to the top plate on a vertical axis, a single caster wheel journaled in said frame centrally and immediately below the pivot by a transverse axle, combined with an extensible draft connection between the axles of the caster wheels of the two caster trucks in alinement with the axles thereof consisting of yokes extending around the caster wheels and hinged to the ends of the axles, a chain connecting with one of the yokes and a turnbuckle connecting the chain with the other yoke.

15. In a rigger's truck the combination of four caster trucks of the character described, transverse boards connecting said caster trucks in pairs, and longitudinal draft connections between the axles of the caster trucks of the two pairs.

In testimony of which invention, I hereunto set my hand.

JOHN ROSS.

Witnesses:
R. M. HUNTER,
R. M. KELLY.